(12) United States Patent  
Cavalier et al.

(10) Patent No.: US 8,596,154 B2
(45) Date of Patent: Dec. 3, 2013

(54) BALLSCREW ASSEMBLY WITH DETECTION FEATURE

(75) Inventors: Donald R. Cavalier, Walker, MI (US); Garen R. Maines, Byron Center, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/606,898

(22) Filed: Sep. 7, 2012

(65) Prior Publication Data
US 2013/0000434 A1    Jan. 3, 2013

Related U.S. Application Data

(62) Division of application No. 12/346,519, filed on Dec. 30, 2008, now Pat. No. 8,281,678.

(51) Int. Cl.
| | |
|---|---|
| *G01D 11/00* | (2006.01) |
| *G01D 13/00* | (2006.01) |
| *G01N 31/22* | (2006.01) |
| *F16H 3/06* | (2006.01) |
| *F16H 27/02* | (2006.01) |
| *F16H 29/02* | (2006.01) |
| *F16H 29/20* | (2006.01) |

(52) U.S. Cl.
USPC .......................................... 74/89.23; 116/200

(58) Field of Classification Search
USPC .............. 74/89.23, 89.26; 116/200, 225, 281, 116/282, 283, 294
See application file for complete search history.

(56) References Cited

U.S. PATENT DOCUMENTS

| | | | |
|---|---|---|---|
| 3,935,754 A | * | 2/1976 | Comollo ...................... 74/665 F |
| 4,256,277 A | | 3/1981 | Embree |
| 4,317,424 A | * | 3/1982 | Steadman ........................ 116/56 |
| 4,572,053 A | | 2/1986 | Sosnowski et al. |
| 4,625,843 A | * | 12/1986 | Maltby et al. .............. 192/223.3 |
| 4,635,491 A | | 1/1987 | Yamano et al. |
| 4,715,567 A | | 12/1987 | Poccard |
| 4,727,762 A | | 3/1988 | Hayashi |

(Continued)

FOREIGN PATENT DOCUMENTS

| | | |
|---|---|---|
| FR | 2536129 A1 | 5/1984 |
| FR | 2858035 A1 | 1/2005 |
| WO | 2006/131949 A2 | 12/2006 |

OTHER PUBLICATIONS

European Patent Office; International Search Report and Written Opinion issued in counterpart PCT application No. PCT/IB2009/007876, mailed Apr. 20, 2010.

*Primary Examiner* — Justin Krause
(74) *Attorney, Agent, or Firm* — Dykema Gossett PLLC

(57) ABSTRACT

A ballscrew assembly for an actuator is provided. In an embodiment, the ballscrew assembly includes a ball nut assembly including a view port; a ballscrew provided within at least a portion of the ball nut assembly; an inner rod provided within the ballscrew in the direction of the longitudinal axis, the inner rod including an enlarged end portion; and a compression mechanism, such that at least a portion of the compression mechanism is provided between the enlarged end portion and the ballscrew. In another embodiment the assembly is configured such that when the inner rod is in a failed state, the compression mechanism provides a force that moves the visual indicator toward the view port. In another embodiment, the assembly includes a proximity sensor in addition to, or in lieu of a view port to detect a failure.

11 Claims, 6 Drawing Sheets

(56) References Cited

U.S. PATENT DOCUMENTS

| | | |
|---|---|---|
| 4,918,921 A | 4/1990 | Leigh-Monstevens et al. |
| 5,702,069 A | 12/1997 | Geyer et al. |
| 5,733,096 A | 3/1998 | Van Doren et al. |
| 5,901,817 A * | 5/1999 | Gitnes .................. 188/134 |
| 6,109,415 A | 8/2000 | Morgan et al. |
| 6,443,034 B1 | 9/2002 | Capewell et al. |
| 6,672,540 B1 | 1/2004 | Shaheen et al. |
| 2002/0195978 A1 | 12/2002 | Oyori |
| 2006/0081078 A1 | 4/2006 | Nagai et al. |
| 2008/0048514 A1 | 2/2008 | Hoffmann et al. |
| 2010/0250047 A1 | 9/2010 | Balasu et al. |
| 2011/0232406 A1 | 9/2011 | Somerfield et al. |

* cited by examiner

BALLSCREW ASSEMBLY WITH DETECTION FEATURE

CROSS REFERENCE TO RELATED APPLICATION

This application is a divisional of U.S. patent application Ser. No. 12/346,519, filed Dec. 30, 2008, the entire contents of which are herein incorporated by reference.

TECHNICAL FIELD

The present invention relates generally to actuation systems, and to ball screw assemblies, including fail-safe ballscrew assemblies for use in connection with aircraft.

BACKGROUND

Modern aircraft include actuation systems. Such systems may include, among other things, components that are pivotally supported relative to portions of the airplane that are subject to adjustment by an operator or pilot. For instance, trimmable horizontal stabilizer actuators commonly consists of a primary ball nut assembly having a ball nut housing and a rotatable ballscrew extending axially through the housing. Rotation of the ballscrew is commonly accomplished by a motor and gearing.

Present technology does not allow for visual inspection or non-invasive detection of fail-safe features of fail-safe ballscrews having inner rods housed within the ballscrew, without actuator or component disassembly. Consequently, it is desirable to provide an assembly the permits improved detection of structural separation of a ballscrew inner rod.

SUMMARY

A ballscrew assembly for an actuator is provided. In an embodiment, the ballscrew assembly includes a ball nut assembly; a ballscrew; an inner rod; and a compression mechanism. The ball nut assembly includes a view port, and the ballscrew is provided within at least a portion of the ball nut assembly. The inner rod is provided within the ballscrew in the direction of the longitudinal axis and includes an enlarged end portion. At least a portion of the compression mechanism is provided between the enlarged end portion and the ballscrew, the assembly being configured such that when the inner rod is in a failed state, the compression mechanism provides a force that moves the visual indicator toward the view port.

In another embodiment, the assembly includes a ball nut assembly, a ballscrew provided within at least a portion of the ball nut assembly, an inner rod within the ballscrew, and a proximity sensor. The proximity sensor may be positioned behind the ballscrew. The assembly may be configured such that, in the event of inner rod separation, a spring force forces an aft portion of the failed rod rearward toward the proximity sensor and the sensor detect a failure condition.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
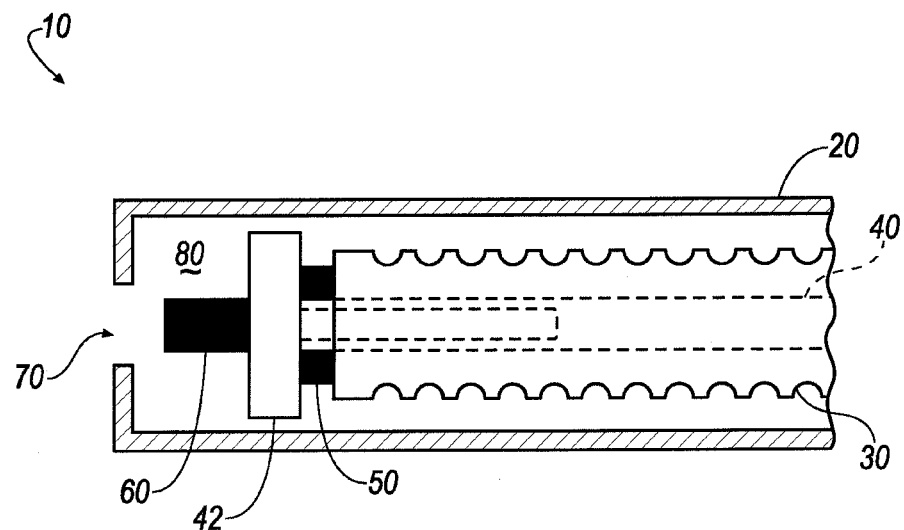
FIG. 1 generally illustrates a cross-sectional schematic view of a portion of a ball nut assembly according to an embodiment of the invention, shown in a non-failed condition.

A cross-sectional schematic view of a portion of a ball nut assembly 10 according to an embodiment of the invention is generally shown in FIG. 1. Embodiments of the invention can, inter alia, provide a detection mechanism for visually indicating a structural separation of the ballscrew inner rod 40.

The illustrated ball nut assembly 10 includes a body portion 20, a ballscrew 30, an inner rod 40, a spring member 50, an indicator 60, and an opening or view port 70. As generally shown, in applications in which an inner rod 40 is contained or provided within the ballscrew 30 in the direction of the longitudinal axis of the ballscrew 30. The inner rod 40 may not be visible in an assembled/operative condition.

In an embodiment, inner rod 40 includes an enlarged end portion 42. At least a portion of the spring (or compression) member 50 may be provided between the enlarged end portion 42 and the ballscrew 30.

Figure 2:
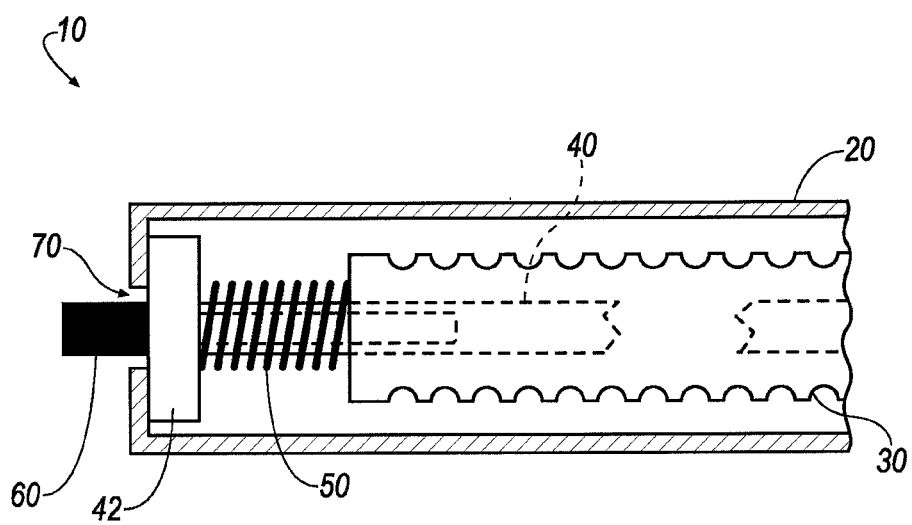
FIG. 2 generally illustrates a cross-sectional schematic view of a portion of a ball nut assembly according to an embodiment of the invention, shown in a failed condition.

In an embodiment, spring member 50 may comprise a spring, such as for example a compression spring. However, other means for providing a similar compressive force may instead, or may additionally, be employed. Without limitation, in a specific embodiment the spring member 50 may include a high-lead, high-rate compression spring. The spring member 50 may be configured such that in normal operation the spring member 50 will be compressed, and the associated indicator 60 will be retained in a first [operational] position. In the event of failure—i.e., a structural failure of inner rod 40—the spring member 50 will no longer be restrained by the inner rod 40, and the spring member 50 will be released from its compressed state. In turn, the spring member 50 can release the indicator 60 from the first [operational] position to a second [failure] position. FIG. 2 generally illustrates a cross-sectional schematic view of the assembly 10 shown in a failed condition.

In an embodiment, such as illustrated in FIGS. 1 and 2, the opening or view port 70 may comprise an aperture or opening through which a portion of indicator 60 may enter and/or pass through. However, in alternative embodiments, the opening or view port 70 may instead include a portion that permits viewing of the indicator 60 in a second [failure] position. For example, the opening or view port 70 may comprise a transparent material and a failure condition may be indicated by the movement of the indicator 60 to a position near or adjacent to the opening or view port 70.

Additionally, whether the opening or view port 70 permits a portion of the indicator to pass through it, the indicator 60 may be provided to include one or more colors (e.g., red or a fluorescent color) for improved visibility.

Further, an associated viewing chamber 80, such as generally illustrated in FIG. 1, may be provided with one or more drain holes or apertures (not shown) to permit an accumulation of liquid. Accumulated liquids in the viewing chamber 80 may be prevented from entering the ballscrew 30 by including ballscrew wipers that may be contained within a ball nut and by lip seals between the rotating ball nut and associated stationary housing.

Figure 3:
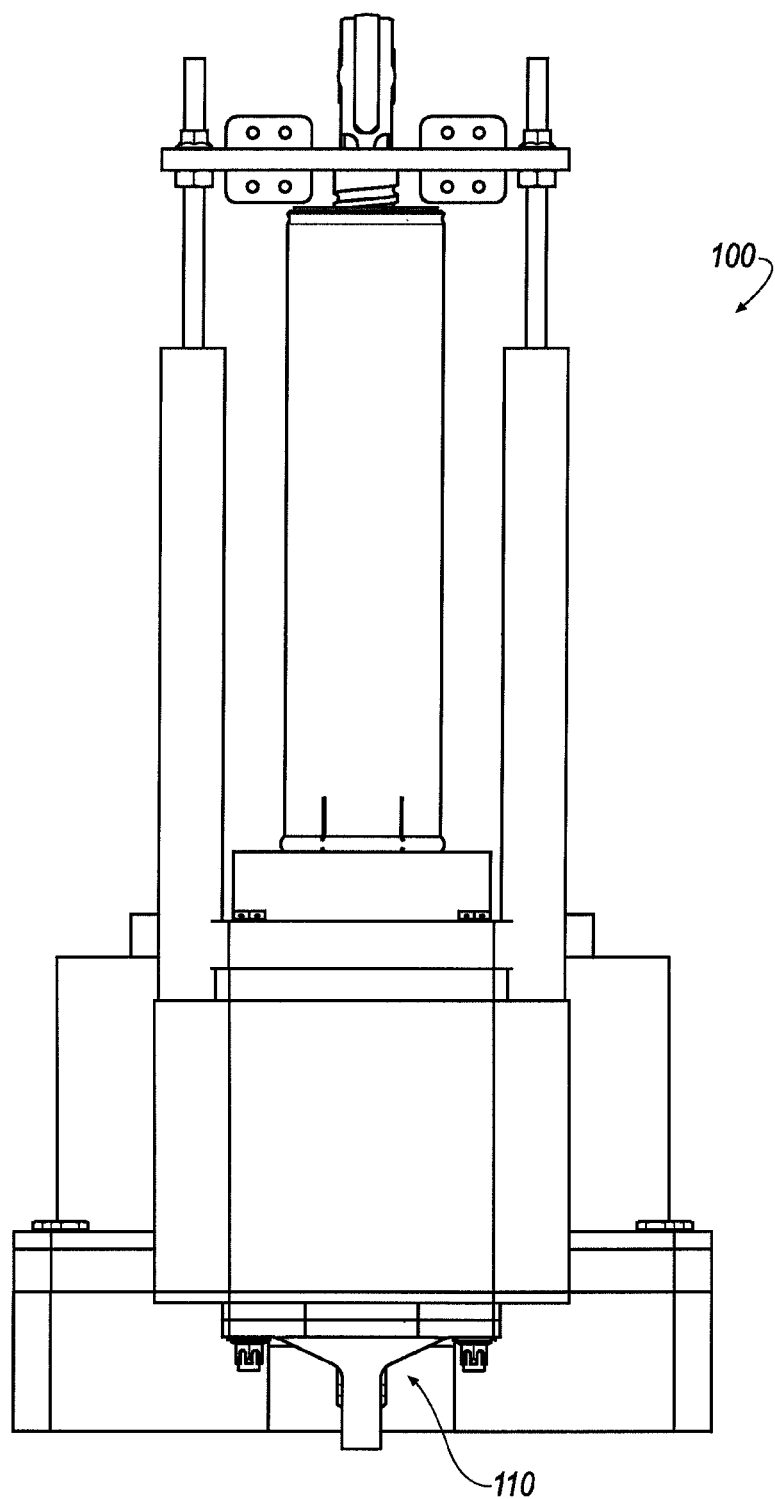
FIG. 3 generally illustrates a top plan view of an actuation system.
Figure 4:
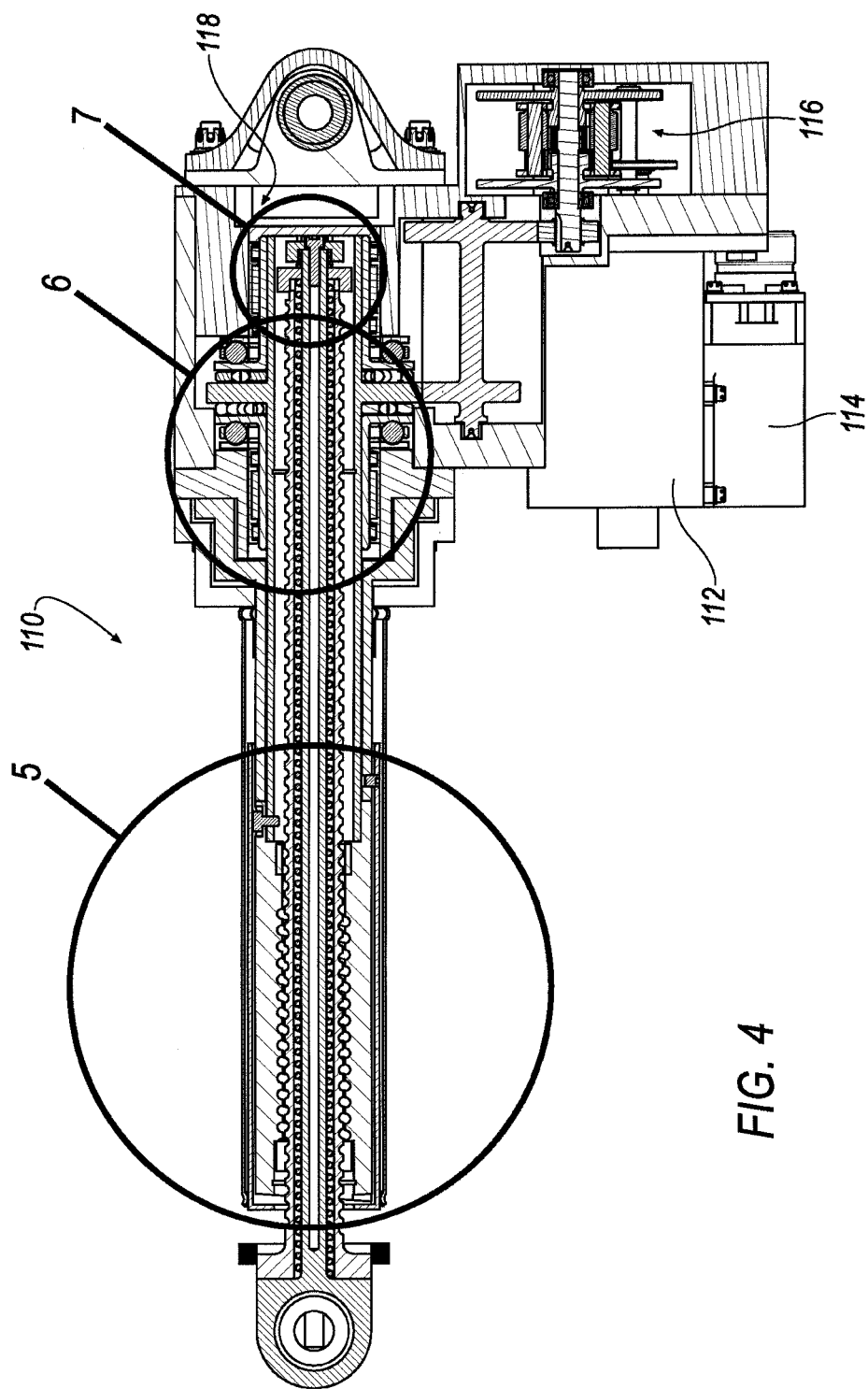
FIG. 4 is a side cross-sectional view of an actuation system of the type shown in FIG. 3, illustrating aspects of an embodiment of the invention.

Additional aspects and features of embodiments of the invention that involve proximity-sensor-type configurations are generally illustrated in FIGS. 3 through 7. FIG. 3 is a top plan view of an embodiment of an actuation system 100. The illustrated system 100 includes a ball nut assembly—generally designated as 110. A side cross-sectional view of the actuation system 110 is illustrated in FIG. 4 and includes additional details. The illustrated embodiment shown in FIG. 4 includes and illustrates, among other things, a DC motor 112, motor electronics 114, a differential gear assembly (which permits two motors to transfer a single torque), and a proximity sensor 118. In an embodiment, the DC motor 112 is a brushless DC motor that includes an integral electromechanical brake.

Figure 5:
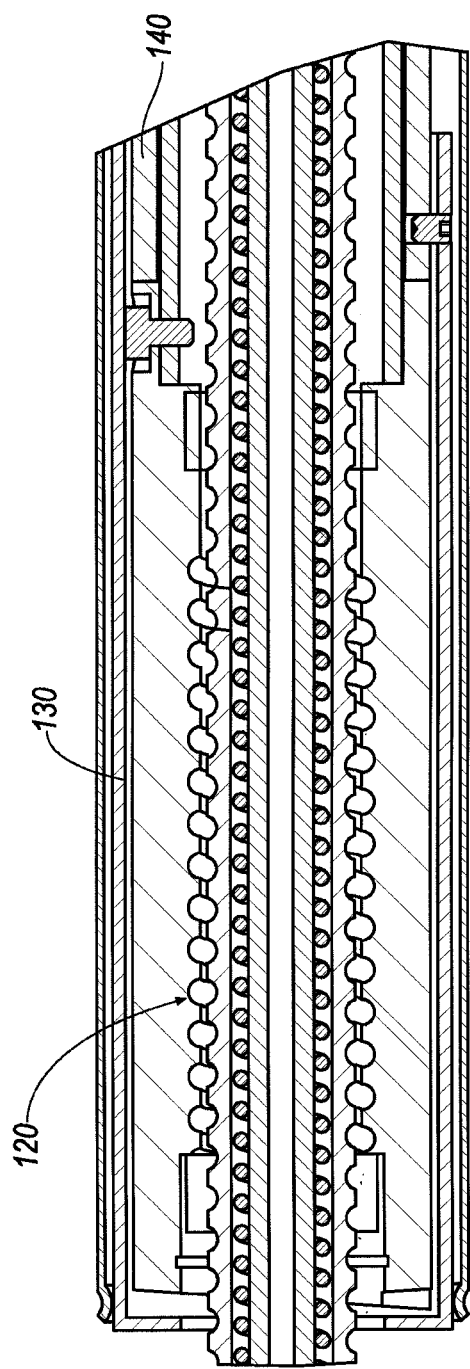
FIG. 5 is an enlarged sectional view of portion 5 illustrated in FIG. 4.
Figure 6:
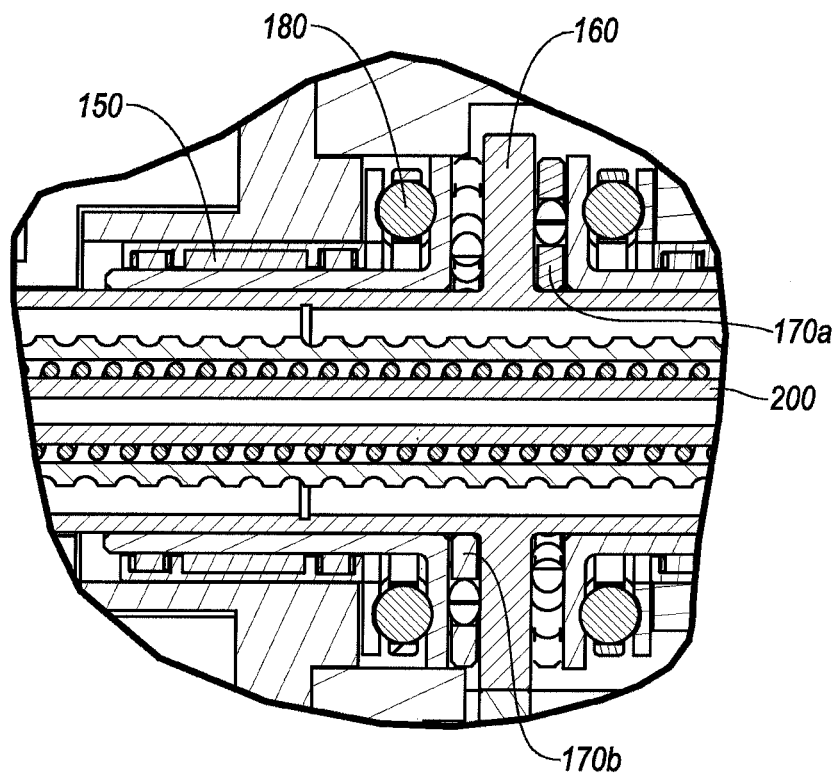
FIG. 6 is an enlarged sectional view of portion 6 illustrated in FIG. 4.

FIG. 5 includes an enlarged sectional view of portion 5 identified in FIG. 4. The illustrated portion of the assembly 110 includes a ball nut 120, a primary load path 130, and a secondary load path 140. As shown in FIG. 6, the assembly 110 may include a one-way drawn cup roller clutch 150, an outer torque tube 160, a skewed roller assembly (identified by component elements 170a and 170b), and ball thrust bearings 180.

Figure 7:
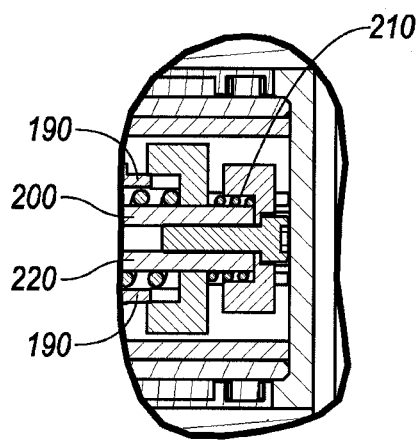
FIG. 7 is an enlarged sectional view of portion 7 illustrated in FIG. 4.

Additional aspects of the invention are illustrated in connection with FIG. 7, which provides an enlarged sectional view of portion 7 illustrated in FIG. 4. The primary ballscrew is identified as element 190. Inner rod 200 is configured to maintain the integrity of the ballscrew in the event of complete ballscrew separation. As generally illustrated, the assembly 110 may include an aft spring mechanism 210 and a forward spring mechanism 220. In an embodiment, the forward spring mechanism 220 provides a larger comparative force than the aft spring mechanism 210. As discussed in the prior embodiment, the aft and/or forward spring mechanisms may comprise a spring, for example, a compression spring.

Figure 7A:
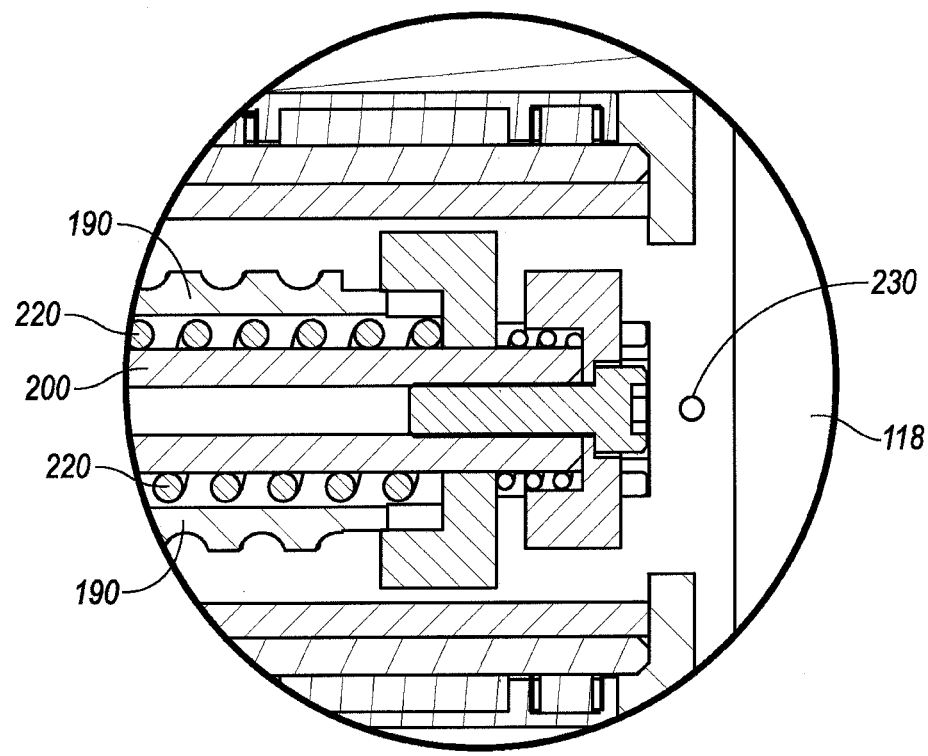
FIG. 7A is another enlarged section view of portion 7 illustrated in FIG. 4.

FIG. 7A also includes an enlarged sectional view of portion 7 illustrated in FIG. 4. As generally illustrated the assembly includes an aperture 230 disposed in a wall between the an end of the screw assembly and the proximity sensor 118. The aperture 230 may be used in connection with the proximity sensor 118 to detect a failed screw.

In the event of inner rod 200 separation, aft spring mechanism 210 forces the aft portion of the failed inner rod 200 rearward towards at least one proximity sensor 118 (for example as generally illustrated in FIG. 4). At least one proximity sensor 118 can be configured to detect the movement of the aft portion of the failed inner rod 200 and identify and/or annunciate a failure event.

Further, if the inner torque tube 160 fails, then the outer torque tube 130 can contain the inner torque tube 160 and help stop rotation—i.e., help provide lock-up.

In the event of a primary ballscrew 190 failure fracture, the forward spring mechanism 220 is configured to force the aft portion of the failed ballscrew 190 rearward toward at least one proximity sensor, which can identify and/or annunciate a failure event.

The present invention is not limited to a particular type or form of proximity sensor. As such, various conventional and other known proximity sensors or devices may be use to provide proximity identification and/or annunciation.

The inclusion of a proximity sensor (or a plurality of proximity sensors) in connection with the assembly 110 can eliminate the need for an inspection peep hole (such as an opening or view port). However, for some embodiments, additional redundancy may be desirable, and the proximity sensor-type configuration generally described in connection with the above embodiment may be used in addition to the indicator-type configuration generally described in connection with the earlier-described embodiment.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A ballscrew assembly for an actuator, the ballscrew assembly comprising:
    a ball nut assembly including a view port;
    a ballscrew provided within at least a portion of the ball nut assembly, the ballscrew having a longitudinal axis;
    an inner rod provided within the ballscrew in the direction of the longitudinal axis, the inner rod including an enlarged end portion; and
    a compression mechanism, at least a portion of the compression mechanism provided between the enlarged end portion and the ballscrew;
    wherein, when the inner rod is in a failed state, the compression mechanism provides a force that moves a visual indicator toward the view port.

2. The assembly of claim 1, wherein the ball nut assembly comprises a ball nut.

3. The assembly of claim 1, wherein the compression mechanism comprises a spring.

4. The assembly of claim 1, wherein a portion of the compression mechanism is provided around the inner rod.

5. The assembly of claim 1, wherein the enlarged end portion includes a visual indicator.

6. The assembly of claim 5, wherein the visual indicator includes a red plug.

7. The assembly of claim 5, wherein the visual indicator includes an extended portion.

8. The assembly of claim 1, wherein the view port comprises an aperture or opening.

9. The assembly of claim 8, wherein the visual indicator comprises an extended portion and, in a failed state, a portion of the extended portion of the visual indicator extends to or through the aperture or opening.

10. The assembly of claim 1, including a one-way clutch assembly connected to the ball nut assembly.

11. The assembly of claim 10, wherein the one-way clutch assembly includes a roller clutch, rollers, and bearings.

\* \* \* \* \*